United States Patent [19]
Endris

[11] Patent Number: 5,535,523
[45] Date of Patent: Jul. 16, 1996

[54] CARPENTER'S SQUARE

[76] Inventor: Matthew K. Endris, 500 Francie St., Porter, Ind. 46304

[21] Appl. No.: 340,744

[22] Filed: Nov. 16, 1994

[51] Int. Cl.⁶ ..................................... G01C 9/28
[52] U.S. Cl. .................. 33/371; 33/474; 33/451; 33/DIG. 1
[58] Field of Search .................. 33/194, 371, 374, 33/376, 451, 474, 478, 480, 535, DIG. 1

[56] References Cited

U.S. PATENT DOCUMENTS

| | | | |
|---|---|---|---|
| 556,840 | 3/1896 | Biggs | 33/478 |
| 635,050 | 10/1899 | Macfarren | 33/480 |
| 636,191 | 10/1899 | Wright | 33/376 X |
| 675,464 | 6/1901 | Carlson | 33/451 |
| 1,182,730 | 5/1916 | Anderson et al. | 33/376 |
| 2,635,351 | 4/1953 | Marcinkowski | 33/376 |
| 3,499,225 | 3/1970 | Darrah | 33/480 |
| 4,654,978 | 4/1987 | Wolford, Jr. | 33/481 |
| 4,773,163 | 9/1988 | Wolford, Jr. | 33/479 |
| 5,103,570 | 4/1992 | Nichols | 33/480 X |
| 5,245,758 | 9/1993 | Riley | 33/376 X |

FOREIGN PATENT DOCUMENTS

| | | | |
|---|---|---|---|
| 1211402 | 3/1960 | France | 33/480 |
| 2428818 | 2/1980 | France | 33/480 |
| 706308 | 3/1954 | United Kingdom | 33/451 |

*Primary Examiner*—William A. Cuchlinski, Jr.
*Assistant Examiner*—G. Bradley Bennett
*Attorney, Agent, or Firm*—Gary M. Hartman; Domenica N. S. Hartman

[57] ABSTRACT

A carpenter's square is provided which is uniquely configured for use in the construction of a building which utilizes metal framing members. The square is adapted to enable a steel wall stud to be aligned and oriented relative to a steel track to which the stud is to be fastened, and thereafter maintained in proper alignment while the stud is being secured to the track. The square includes a pair of detachable legs. One leg has an inner longitudinal edge formed with a longitudinal recess which extends across the entire width of the edge, such that a gap is created between the leg and a planar surface abutted against the edge of the leg. The longitudinal recess accommodates a portion of the track which extends over the stud, as well as the head of a fastener used to secure the stud to the track. To stabilize and secure the square to the wall stud, at least one of the legs is equipped with a magnetic portion which magnetically adheres the leg to the stud or track. The square is also preferably equipped with at least one level mounted to at least one of the legs in order to verify the proper orientation of the stud relative to the track.

18 Claims, 2 Drawing Sheets

CARPENTER'S SQUARE

BACKGROUND OF THE INVENTION

1. Field of the Invention

The present invention generally relates to a carpenter's square which is uniquely configured for use in commercial construction which utilizes steel framing members. More particularly, this invention relates to a carpenter's square which is adapted for use in aligning a steel wall stud relative to a steel track to which the stud is to be fastened, such that the stud can be maintained in proper alignment while the stud is being secured to the track.

2. Description of the Prior Art

Carpenter's squares are generally characterized by a pair of legs disposed at a right angle to each other, often with one leg being longer than the other. Numerous variations have been proposed in the past so as to make a carpenter's square more versatile or its use more convenient, and at times to better adapt a square for a particular application. Examples of the former category include U.S. Pat. No. 556,840 to Biggs which teaches a carpenter's square whose two legs can be assembled and disassembled; U.S. Pat. No. 3,499,225 to Darrah which teaches an ironworker's tool having bar magnets which enable the tool to be magnetically held in place against a metal beam while a worker aligns and secures a second beam to the first; and U.S. Pat. No. 675,464 to Carlson which teaches a square equipped with a detachable level mounted to one of its legs. Notably, the presence of one or more levels on a carpenter's square increases its versatility by enabling the square to be used not only to align and orient two members relative to each other, but also relative to the earth, or vertical.

In the commercial construction industry in which metal framing members are used to form a building's framing structure, the framing members typically consist of metal studs which are secured to one or more channel tracks. Generally, the track is a C-shaped beam which is oriented horizontally in the construction of a building, while the stud is also typically a C-shaped beam which is oriented vertically in the structure. The interior cavity of the track receives an end of the stud, with screws being inserted through the sides, or legs, of the track in order to secure the stud to the track. The assembled framing structure formed by the assembled stud and track are often used to form walls, half walls or partitions, and soffits within the interior of a building.

As with all constructions, it is important that the studs and tracks be properly aligned and oriented relative to each other, the building's foundation, and the vertical. However, due to the manner in which the studs and tracks are assembled, a conventional carpenter's square is often difficult to use when aligning and orienting the framing members. More particularly, the square is unstable when spanning both the stud and track. As a result, the use of a square equipped with a plumb level is generally limited to positioning the stud relative to vertical and checking the orientation of the stud relative to the track in separate steps. Notably, use of the square must not interfere with access to the fasteners used to secure the stud to the track. Inevitably, the position of the stud and/or track is likely to change while the fasteners are being driven, necessitating that remeasurements be made after assembly and, when required, errors corrected by partially disassembling, repositioning and resecuring the stud and track.

Consequently, various other tools have been suggested to perform this function, as evidenced by U.S. Pat. Nos. 4,654,978 and 4,773,163 to Wolford, Jr. According to Wolford, Jr., the function of a carpenter's square is performed by a tool equipped with a magnet to hold the tool in place against the stud. The tool is configured to enable the stud to be more readily measured and marked for cutting, such that proper alignment of the assembled framing structure is promoted. Notably, Wolford, Jr. identifies difficulties in securing a metal stud to its track, including the difficulty of a single person to make appropriate measurements and maintain proper orientation of the framing structure while securing the stud to the track.

While the tool taught by Wolford, Jr. facilitates the alignment of a stud relative to a track, the tool has limited use if the track is not properly oriented and secured to the existing framed structure or the foundation of the building. In particular, it is important that the stud and track remain properly oriented relative to each other and to the building's foundation while the fasteners which secure the stud to the track are tightened.

Thus, within the commercial construction industry, it would be desirable to have a tool which is capable of properly orienting a metal stud and track relative to each other, and is further capable of maintaining that orientation during the task of securing the stud to the track.

SUMMARY OF THE INVENTION

It is an object of this invention to provide a carpenter's square which is adapted for use in aligning and orienting a steel wall stud relative to vertical and to a U-shaped steel track to which the stud is to be fastened, such that the stud will remain properly aligned and oriented while the stud is being secured to the track.

It is a further object of this invention that such a carpenter's square be configured with a recess which accommodates a portion of the track that projects over the stud, so as to promote proper alignment of the stud and permit the square to remain in place while the stud is fastened to the track.

Lastly, it is still a further object of this invention that such a carpenter's square also be equipped with additional features which further promote the versatility and capacity for the square's use in the assembling of a metal stud to a metal track in a commercial construction.

In accordance with a preferred embodiment of this invention, these and other objects and advantages are accomplished as follows.

According to the present invention, there is provided a carpenter's square which is uniquely configured for use in the construction of a building which utilizes metal framing members. The carpenter's square of this invention is adapted to enable a steel wall stud to be aligned and oriented relative to a U-shaped steel track to which the stud is to be fastened, and maintained in proper alignment and orientation while the stud is being secured to the track.

The carpenter's square generally includes a pair of legs, a first of which has an inner longitudinal edge characterized by a longitudinal length and a width in a direction perpendicular to the plane of the square. The second leg is preferably detachably secured to the first leg, and is oriented to be at approximately a right angle to the first leg, extending from the inner longitudinal edge of the first leg. The second leg also has an inner longitudinal edge which, in conjunction with the inner longitudinal edge of the first leg, forms the interior profile of the right angle formed by the square.

A longitudinal recess is formed in the inner longitudinal edge of the first leg and extends across the entire width of the inner longitudinal edge, so as to create a gap between the first leg and any planar surface abutted against the inner longitudinal edge of the first leg. Importantly, the longitudinal recess is sufficiently large to accommodate a leg of the U-shaped track which extends along a side of the stud when the stud and track are properly mated and aligned, so as to promote proper alignment of the stud and permit the square to remain in place while the stud is fastened to the track. Preferably, the longitudinal recess is also sufficiently large to accommodate the head of a fastener used to secure the stud to the track. Necessarily, the longitudinal recess has a longitudinal length which is less than the longitudinal length of the first leg. When the first and second legs are properly assembled, the longitudinal recess preferably intersects or is contiguous with the inner longitudinal edge of the second leg.

To stabilize and secure the carpenter's square to the wall stud, at least one of the legs is equipped with a magnetic member, portion or region which magnetically adheres the leg to the stud or track. The legs are preferably detachable from each other so as to enable the carpenter's square to be adapted to various circumstances. For this purpose, the first leg preferably has an opening formed in one end thereof, and the second leg has at least one end configured to be received within the opening. The carpenter's square is also preferably equipped with at least one level mounted to at least one of the legs, and preferably a plumb vial and a level vial in order to verify the proper orientation of the stud relative to the track, and vice versa.

In use, the carpenter's square can be positioned with the first leg abutting a metal stud and the second leg abutting a track to which the metal stud is to be secured with fasteners. In this manner, the longitudinal recess formed in the inner longitudinal edge of the first leg will form a gap which is between the first leg and the stud. Intentionally, the recess is sufficiently large to accommodate the track and the head of each fastener which has been threaded into the track. The proper orientation of the stud and track can then be achieved by physically repositioning the stud and/or track, and thereafter continuously confirmed with the square while the fasteners are further tightened to secure the stud and track together, thus permanently maintaining their proper alignment with each other.

In the above manner, a single person can make the appropriate measurements and thereafter maintain the proper orientation of the framing structure while securing the stud to the track. As a result, the present invention advantageously avoids the previous requirement for making remeasurements after securing the stud and track, which inevitably identifies errors which must be corrected by partially disassembling, repositioning and resecuring the stud and track.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE PREFERRED EMBODIMENT

A carpenter's square is provided which greatly simplifies the procedure for aligning, orienting and securing a metal framing member, or stud, to a channel track used in the construction of a metal framing structure. In particular, the carpenter's square enables access to the fasteners which secure the stud to the track, while allowing the square to remain in place so as to continuously monitor the alignment and orientation of the stud and track relative to each other. The square can be formed from any material that will yield a suitably rigid square which resists flexing when the square is in use.

Figure 3:
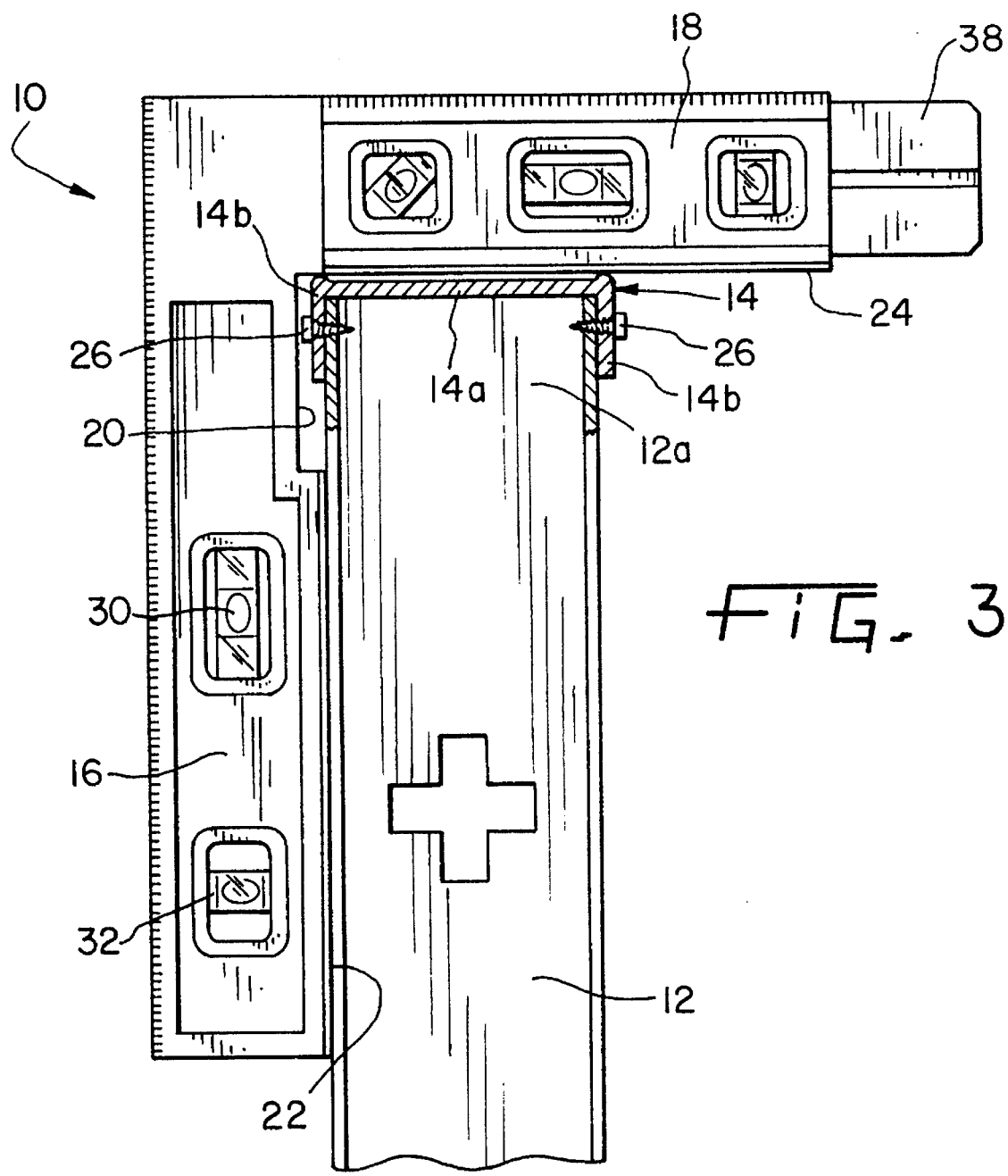
FIG. 3 shows the carpenter's square of FIG. 1 in use to align and orient a stud and track of a metal framing structure.

An illustrative example of a suitable application for the carpenter's square of this invention is shown in FIG. 3, in which the square 10 is shown positioned on a stud 12 and track 14 which have been properly mated with each other. In particular, one end 12a of the stud 12 is shown received within the interior of the track 14, with the end 12a being abutted against the wide portion, or web 14a, of the track 14. As such, the sides, or legs 14b, of the track 14 are positioned adjacent opposite sides of the stud 12. This arrangement is entirely conventional and need not be discussed in greater detail. Furthermore, the teachings of this invention are not to be construed as being limited to any particular type of stud or track design, but is generally applicable to metal framing structures.

As shown, the square 10 is positioned on the stud 12 and track 14 such that a first leg 16 of the square 10 is abutted against a side of the stud 12, while a second leg 18 of the square 10 is abutted against the web 14a of the track 14. Notably, the first leg 16 is capable of being firmly abutted against the stud 12 due to the presence of a recess 20 formed in an inner longitudinal edge 22 of the first leg 16. Specifically, the recess 20 is sufficiently deep (in a direction perpendicular to the edge 22 and across the face of the square 10) in order to accommodate the corresponding leg 14b of the track 14 and a fastener 26 which serves to secure the leg 14b to the stud 12.

Figure 1:
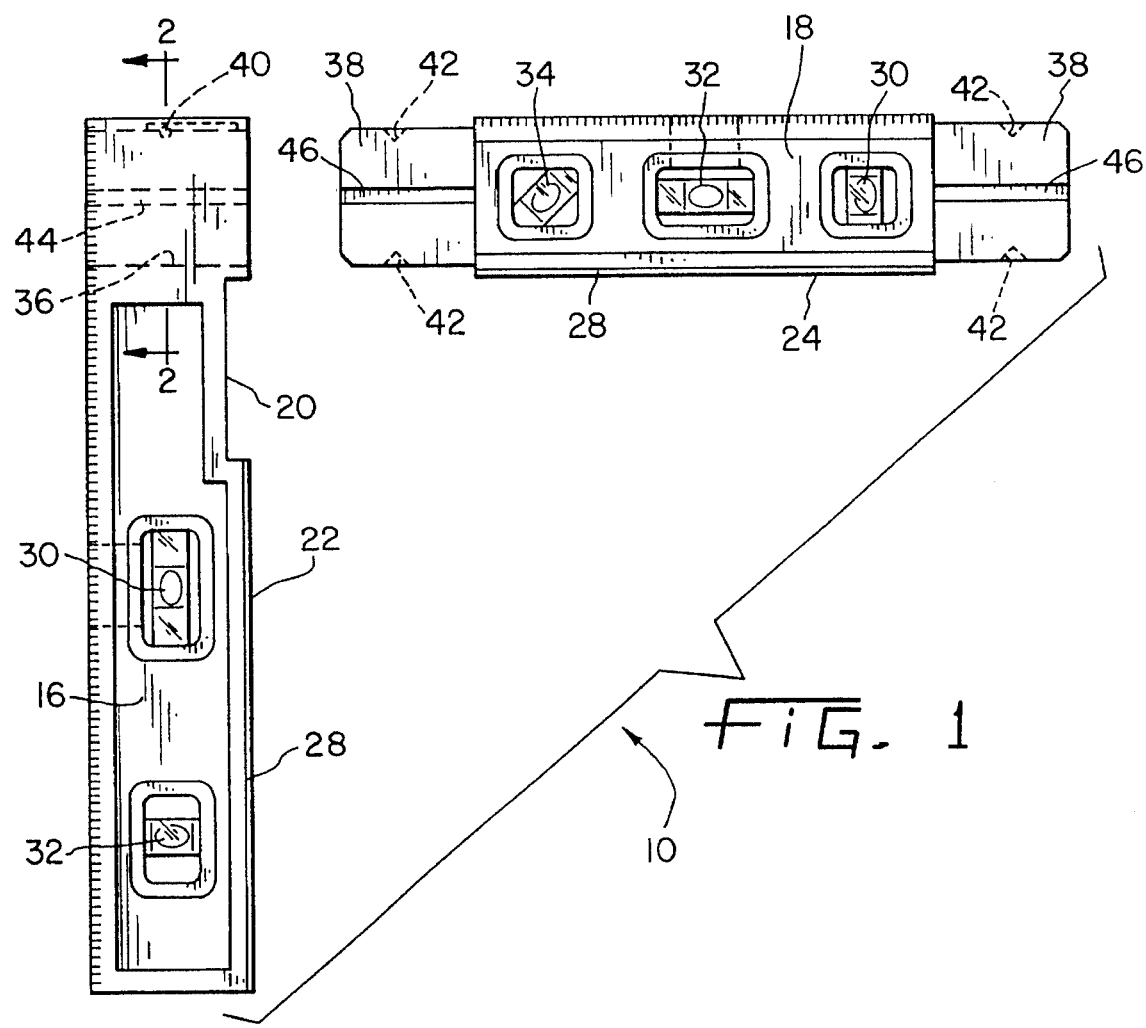
FIG. 1 shows an exploded view of a carpenter's square which is configured in accordance a preferred embodiment of this invention.

In addition, and as shown in FIGS. 1 and 3, the recess 20 extends longitudinally along a limited portion of the edge 22 of the first leg 16, and preferably intersects the inner longitudinal edge 24 of the second leg 18. The recess 20 illustrated in the figures is generally rectangular, preferably having a longitudinal length of at least about 5 centimeters and recessed at least about 1 centimeter into the inner longitudinal edge 22 of the first leg 16, though numerous other shapes and sizes for the recess 20 are foreseeable. As also shown, the end of the recess 20 nearest the second leg 18 is preferably flush with the edge 24 of the second leg 18 in order to prevent interference between the first leg 16 of the square 10 and the leg 14b of the track 14. Foreseeably, the recess 20 could extend a limited distance beyond the edge 24 of the second leg 18 if necessary or desirable.

For purposes of stability, the first leg 16 is preferably longer than the second leg 18, though it is foreseeable that the legs 16 and 18 could have identical lengths or the second leg 18 could be formed longer than the first leg 16. To further promote the stability of the square 10 during use, at least one of the legs 16 and 18, and preferably each of the legs 16 and 18, is equipped with a magnetic region, portion or member which magnetically adheres the square 10 to the stud 12 and track 14. As shown in FIG. 1, suitable methods for providing this feature include bars or strips 28 of a suitable magnetic material which are secured to the inner longitudinal edges 22 and 24 of the legs 16 and 18, though it is also foreseeable that numerous other techniques could be used to deposit or secure a suitable magnetic material to the edges 22 and 24. Alternatively, each of the legs 16 and 18 could be formed from a magnetic material to perform this function.

The square 10 of this invention is also illustrated to include a number of levels with which the orientation and alignment of the stud 12 and track 14 are determined and maintained. More particularly, each leg 16 and 18 is preferably equipped with a plumb vial 30 and a level vial 32 by which proper orientation can be determined. As shown, each leg 16 and 18 can also be equipped with an angled vial 34, if so desired.

The square 10 is preferably an assembly in which the legs 16 and 18 can be disassembled from each other. This feature is advantageous when using the square 10 among framing structures which cannot be accessed by a rigid one-piece square, for enabling the use of the square 10 as a conventional square, as well as to facilitate storage of the square 10. The manner in which this feature is achieved is shown in greater detail in FIG. 2.

Generally, the first leg 16 is equipped with an opening 36 which is sized to receive an end of the second leg 18 having a reduced cross-section. As shown, each end 38 of the second leg 18 preferably has a reduced cross-section, such that either end 38 can be inserted into the opening 36. As a result, the second leg 18 can be removed and its opposite end inserted into the opening 36 to check the orientation of an adjacent structure while the first leg 16 remains in position on the stud 12.

Though the opening 36 could be formed as a slot or trough formed in the end of the first leg 16, the opening 36 is preferably a through-hole in the end of the first leg 16 equipped with the recess 20, as shown. Preferably, each end 38 of the second leg 18 is equipped with a spring-loaded ball 40 which cooperates with a detent 42 formed on an interior surface of the opening 36 for releasably securing the second leg 18 to the first leg 16. Other quick-release locking mechanisms could foreseeably be used for this purpose. In addition, the legs 16 and 18 could be secured together with a wide variety of locking devices and fasteners which do not provide the quick-release capability preferred by this invention.

Figure 2:
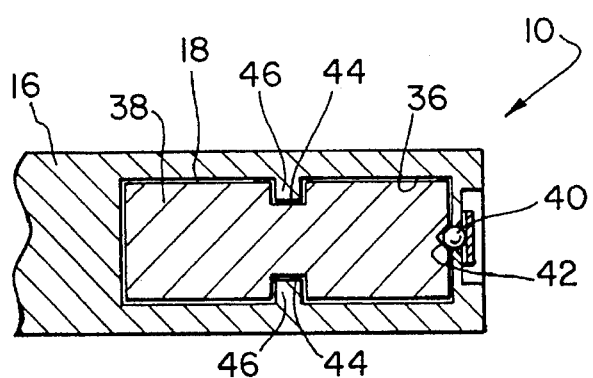
FIG. 2 shows in cross-section the carpenter's square of this invention along line 2—2 of FIG. 1.

As also shown in FIG. 2, for the purpose of stabilizing the legs 16 and 18 relative to each other, a pair of longitudinal ribs 44 are formed on each side of the opening 36, and a pair of longitudinal channels 46 are formed on each end 38 of the second leg 18. As such, when one end 38 of the second leg 18 is inserted in the opening 36, each rib 44 engages and mates with one of the channels 46 so as to reinforce the perpendicular orientation of the legs 16 and 18 and stabilize the joint formed therewith.

With reference again to FIG. 3, use of the carpenter's square 10 of this invention involves positioning the square 10 on the stud 12 and track 14 such that its first leg 16 abuts the stud 12 and its second leg 18 abuts the track 14 as shown. In this manner, a gap is created between the first leg 16 and the stud 12 and track 14 by the recess 20 formed in the inner longitudinal edge 22 of the first leg 16. Apparent from FIG. 3 is that the recess 20 is sufficiently large and deep to form a gap which can accommodate the head of one of the fasteners 26 threaded into the near leg 14a of the track 14. The proper orientation of the stud 12 and track 14 is then achieved by physically repositioning the stud 12 and/or track 14 until the levels 30, 32 and 34 indicate that the stud 12 and track 14 are properly positioned. Thereafter, while the square 10 remains in position on the stud 12 and track 14 to continuously monitor their positions, the fastener 26 is tightened to secure the stud 12 and track 14 together, resulting in the orientation achieved and confirmed with the square 10 being permanently maintained with the fastener 26.

In accordance with the above, a single worker can make the appropriate initial measurements, bring the stud 12 and track 14 into their appropriate positions, and confirm and maintain their proper orientations while simultaneously securing the stud 12 to the track 14. Because the square 10 is never removed from the stud 12 and track 14, the present invention advantageously avoids the previous requirement for making remeasurements after the fasteners 26 have been tightened, which occasionally indicates that an error occurred, requiring that the stud 12 and track 14 be partially disassembled, repositioned and resecured.

While our invention has been described in terms of a preferred embodiment, it is apparent that other forms could be adopted by one skilled in the art, for example by modifying the appearance or structure of the square, or by substituting appropriate materials. Accordingly, the scope of our invention is to be limited only by the following claims.

The embodiments of the invention in which an exclusive property or privilege is claimed are defined as follows:

1. A tool for aligning a wall stud relative to a U-shaped track to which the stud is to be secured with fasteners, wherein legs of the U-shaped track extend along opposite sides of the stud when the stud and the U-shaped track are mated and wherein the fasteners secure the legs of the U-shaped track to the stud, the tool comprising:

a first leg having an inner longitudinal edge characterized by a longitudinal length and a width in a direction perpendicular to a plane defined by the first leg;

a second leg detachably secured to the first leg, the second leg extending from the inner longitudinal edge of the first leg so as to be oriented at approximately a right angle to the first leg;

a longitudinal recess formed in the inner longitudinal edge of the first leg, the longitudinal recess extending across the entire width of the inner longitudinal edge so as to create a gap between the first leg and a planar surface abutted against the inner longitudinal edge of the first leg, the longitudinal recess having a longitudinal length of at least about 5 centimeters so as to accommodate one of the legs of the U-shaped track and being recessed at least about 1 centimeter into the inner longitudinal edge of the first leg so as to accommodate a corresponding one of the fasteners, the longitudinal length being less than the longitudinal length of the inner longitudinal edge of the first leg; and magnetic means associated with at least one of the first and second legs for stabilizing and securing the carpenter's square to the wall stud.

2. A carpenter's square as recited in claim 1 wherein the second leg has an inner longitudinal edge which is adjacent the inner longitudinal edge of the first leg, and wherein the longitudinal recess in the first leg intersects the inner longitudinal edge of the second leg.

3. A carpenter's square as recited in claim 1 wherein the first leg is longer than the second leg.

4. A carpenter's square as recited in claim 1 wherein the first leg has an opening formed in one end thereof, and wherein the second leg has at least one end configured to be received within the opening formed in the one end of the first leg.

5. A carpenter's square as recited in claim 1 further comprising at least one level mounted to the first leg.

6. A carpenter's square as recited in claim 1 further comprising at least one level mounted to the second leg.

7. A carpenter's square as recited in claim 1 further comprising means for detachably securing the second leg to the first leg.

8. A carpenter's square for aligning a metal wall stud relative to a metal U-shaped track to which the wall stud is to be secured with fasteners, wherein legs of the U-shaped track extend along opposite sides of the wall stud when the wall stud and the U-shaped track are mated and wherein the fasteners secure the legs of the U-shaped track to the wall stud, the carpenter's square comprising:

a first leg having an inner longitudinal edge characterized by a longitudinal length and a width in a direction perpendicular to a plane defined by the first leg, the first leg having an opening formed in one end thereof;

a second leg having at least one end received within the opening formed in the one end of the first leg, the second leg extending from the inner longitudinal edge of the first leg so as to be oriented at approximately a right angle to the first leg;

a longitudinal recess formed in the inner longitudinal edge of the first leg, the longitudinal recess extending across the entire width of the inner longitudinal edge of the first leg so as to create a gap between the first leg and a planar surface abutted against the inner longitudinal edge of the first leg, the longitudinal recess having a longitudinal length of at least about 5 centimeters so as to accommodate one of the legs of the U-shaped track and being recessed at least about 1 centimeter into the inner longitudinal edge of the first leg so as to accommodate a corresponding one of the fasteners, the longitudinal length being less than the longitudinal length of the inner longitudinal edge of the first leg;

first magnetic means associated with the first leg for stabilizing and securing the first leg to the wall stud; and second magnetic means associated with the second leg for stabilizing and securing the second leg to the track.

9. A carpenter's square as recited in claim 8 wherein the first leg is longer than the second leg.

10. A carpenter's square as recited in claim 8 wherein the opening is a through-hole formed in the one end of the first leg.

11. A carpenter's square as recited in claim 8 further comprising at least one level mounted to the first leg.

12. A carpenter's square as recited in claim 8 further comprising at least one level mounted to the second leg.

13. A carpenter's square as recited in claim 8 further comprising means for retaining the at least one end of the second leg within the opening formed in the one end of the first leg.

14. A carpenter's square for aligning a metal wall stud relative to a metal U-shaped track to which the stud is to be secured with fasteners, wherein legs of the U-shaped track extend along opposite sides of the wall stud when the wall stud and the U-shaped track are mated and wherein the fasteners secure the legs of the U-shaped track to the wall stud, the carpenter's square comprising:

a first leg having an inner longitudinal edge characterized by a longitudinal length and a width in a direction perpendicular to a plane defined by the first leg, the first leg having an opening formed in one end thereof;

a second leg having one end receivable within the opening formed in the one end of the first leg so as to orient the second leg at approximately a right angle to the first leg, wherein the second leg extends from the inner longitudinal edge of the first leg such that an inner longitudinal edge of the second leg is adjacent the inner longitudinal edge of the first leg;

a longitudinal recess formed in the inner longitudinal edge of the first leg, the longitudinal recess extending across the entire width of the inner longitudinal edge so as to create a gap between the first leg and a planar surface abutted against the inner longitudinal edge of the first leg, the longitudinal recess having a longitudinal length of at least about 5 centimeters so as to accommodate one of the legs of the U-shaped track and being recessed at least about 1 centimeter into the inner longitudinal edge of the first leg so as to accommodate a corresponding one of the fasteners, the longitudinal length being less than the longitudinal length of the inner longitudinal edge of the first leg, the recess intersecting the inner longitudinal edge of the second leg;

first magnetic means disposed on the inner longitudinal edge of the first leg for stabilizing and securing the first leg to the wall stud; and second magnetic means disposed on the inner longitudinal edge of the second leg for stabilizing and securing the second leg to the track.

15. A carpenter's square as recited in claim 14 wherein the first leg is longer than the second leg.

16. A carpenter's square as recited in claim 14 wherein the opening is a through-hole formed in the one end of the first leg.

17. A carpenter's square as recited in claim 14 further comprising at least one level mounted to the first leg and at least one level mounted to the second leg.

18. A carpenter's square as recited in claim 14 further comprising means for retaining the one end of the second leg in the opening in the one end of the first leg.

\* \* \* \* \*